(12) United States Patent
Anderson

(10) Patent No.: US 8,063,889 B2
(45) Date of Patent: Nov. 22, 2011

(54) BIOMETRIC DATA COLLECTION SYSTEM

(75) Inventor: Bruce W. Anderson, Andover, MN (US)

(73) Assignee: Honeywell International Inc., Morristown, NJ (US)

( * ) Notice: Subject to any disclaimer, the term of this patent is extended or adjusted under 35 U.S.C. 154(b) by 911 days.

(21) Appl. No.: 11/739,944

(22) Filed: Apr. 25, 2007

(65) Prior Publication Data

US 2008/0267456 A1    Oct. 30, 2008

(51) Int. Cl.
*G06F 3/041*    (2006.01)
(52) U.S. Cl. .................... 345/173; 345/172; 345/174
(58) Field of Classification Search .......... 345/156–179; 382/115–127; 713/182–186; 340/5.52–5.54, 340/5.8–5.86
See application file for complete search history.

(56) References Cited

U.S. PATENT DOCUMENTS

| | | | |
|---|---|---|---|
| 4,641,349 A | 2/1987 | Flom et al. |
| 4,836,670 A | 6/1989 | Hutchinson |
| 5,231,674 A | 7/1993 | Cleveland et al. |
| 5,291,560 A | 3/1994 | Daugman |
| 5,293,427 A | 3/1994 | Ueno et al. |
| 5,359,382 A | 10/1994 | Uenaka |
| 5,404,013 A | 4/1995 | Tajima |
| 5,551,027 A | 8/1996 | Choy et al. |
| 5,572,596 A | 11/1996 | Wildes et al. |
| 5,608,472 A | 3/1997 | Szirth et al. |
| 5,664,239 A | 9/1997 | Nakata |
| 5,717,512 A | 2/1998 | Chmielewski, Jr. et al. |
| 5,751,836 A | 5/1998 | Wildes et al. |
| 5,859,686 A | 1/1999 | Aboutalib et al. |
| 5,860,032 A | 1/1999 | Iwane |
| 5,896,174 A | 4/1999 | Nakata |
| 5,901,238 A | 5/1999 | Matsushita |
| 5,909,269 A | 6/1999 | Isogai et al. |
| 5,953,440 A | 9/1999 | Zhang et al. |
| 5,956,122 A | 9/1999 | Doster |
| 5,978,494 A | 11/1999 | Zhang |
| 6,005,704 A | 12/1999 | Chmielewski, Jr. et al. |
| 6,007,202 A | 12/1999 | Apple et al. |
| 6,012,376 A | 1/2000 | Hanke et al. |
| 6,021,210 A | 2/2000 | Camus et al. |

(Continued)

FOREIGN PATENT DOCUMENTS

EP    0484076    5/1992

(Continued)

OTHER PUBLICATIONS

Bonney et al., "Iris Pattern Extraction Using Bit Planes and Standard Deviations," IEEE, pp. 582-586, 2004.

(Continued)

*Primary Examiner* — Vijay Shankar
(74) *Attorney, Agent, or Firm* — Seager, Tufte & Wickhem LLC

(57) ABSTRACT

A data collection system having a touch screen and sensors behind the touch screen for obtaining biometric data about the user. While the user is making entries on the touch screen, one or more fingerprints of the user may be taken. There may be cameras taking pictures of the user for face and iris recognition purposes. There may be microphones detecting sounds for attaining voice prints of the user. Other data about the user may be acquired during use of the touch screen. This data and information may be obtained about the user without the user being aware of such acquisition.

18 Claims, 2 Drawing Sheets

U.S. PATENT DOCUMENTS

| | | | |
|---|---|---|---|
| 6,028,949 A | 2/2000 | McKendall | |
| 6,055,322 A | 4/2000 | Salganicoff et al. | |
| 6,064,752 A | 5/2000 | Rozmus et al. | |
| 6,069,967 A | 5/2000 | Rozmus et al. | |
| 6,081,607 A | 6/2000 | Mori et al. | |
| 6,088,470 A | 7/2000 | Camus et al. | |
| 6,091,899 A | 7/2000 | Konishi et al. | |
| 6,101,477 A | 8/2000 | Hohle et al. | |
| 6,104,431 A | 8/2000 | Inoue et al. | |
| 6,108,636 A | 8/2000 | Yap et al. | |
| 6,119,096 A | 9/2000 | Mann et al. | |
| 6,120,461 A | 9/2000 | Smyth | |
| 6,134,339 A | 10/2000 | Luo | |
| 6,144,754 A | 11/2000 | Okano et al. | |
| 6,246,751 B1 | 6/2001 | Bergl et al. | |
| 6,247,813 B1 | 6/2001 | Kim et al. | |
| 6,252,977 B1 | 6/2001 | Salganicoff et al. | |
| 6,282,475 B1 | 8/2001 | Washington | |
| 6,285,505 B1 | 9/2001 | Melville et al. | |
| 6,285,780 B1 | 9/2001 | Yamakita et al. | |
| 6,289,113 B1 | 9/2001 | McHugh et al. | |
| 6,299,306 B1 | 10/2001 | Braithwaite et al. | |
| 6,309,069 B1 | 10/2001 | Seal et al. | |
| 6,320,610 B1 | 11/2001 | Van Sant et al. | |
| 6,320,612 B1 | 11/2001 | Young | |
| 6,320,973 B2 | 11/2001 | Suzaki et al. | |
| 6,323,761 B1 | 11/2001 | Son | |
| 6,325,765 B1 | 12/2001 | Hay et al. | |
| 6,330,674 B1 | 12/2001 | Angelo et al. | |
| 6,332,193 B1 | 12/2001 | Glass et al. | |
| 6,344,683 B1 | 2/2002 | Kim | |
| 6,370,260 B1 | 4/2002 | Pavlidis et al. | |
| 6,377,699 B1 | 4/2002 | Musgrave et al. | |
| 6,393,136 B1 | 5/2002 | Amir et al. | |
| 6,400,835 B1 | 6/2002 | Lemelson et al. | |
| 6,424,727 B1 | 7/2002 | Musgrave et al. | |
| 6,424,845 B1 | 7/2002 | Emmoft et al. | |
| 6,433,818 B1 | 8/2002 | Steinberg et al. | |
| 6,438,752 B1 | 8/2002 | McClard | |
| 6,441,482 B1 | 8/2002 | Foster | |
| 6,446,045 B1 | 9/2002 | Stone et al. | |
| 6,483,930 B1 | 11/2002 | Musgrave et al. | |
| 6,484,936 B1 | 11/2002 | Nicoll et al. | |
| 6,490,443 B1 | 12/2002 | Freeny, Jr. | |
| 6,493,669 B1 | 12/2002 | Curry et al. | |
| 6,494,363 B1 | 12/2002 | Roger et al. | |
| 6,503,163 B1 | 1/2003 | Van Sant et al. | |
| 6,505,193 B1 | 1/2003 | Musgrave et al. | |
| 6,506,078 B1 | 1/2003 | Mori et al. | |
| 6,508,397 B1 | 1/2003 | Do | |
| 6,516,078 B1 | 2/2003 | Yang et al. | |
| 6,516,087 B1 | 2/2003 | Camus | |
| 6,516,416 B2 | 2/2003 | Gregg et al. | |
| 6,522,772 B1 | 2/2003 | Morrison et al. | |
| 6,523,165 B2 | 2/2003 | Liu et al. | |
| 6,526,160 B1 | 2/2003 | Ito | |
| 6,532,298 B1 | 3/2003 | Cambier et al. | |
| 6,540,392 B1 | 4/2003 | Braithwaite | |
| 6,542,624 B1 | 4/2003 | Oda | |
| 6,546,121 B1 | 4/2003 | Oda | |
| 6,553,494 B1 | 4/2003 | Glass | |
| 6,580,356 B1 | 6/2003 | Alt et al. | |
| 6,591,001 B1 | 7/2003 | Oda et al. | |
| 6,591,064 B2 | 7/2003 | Higashiyama et al. | |
| 6,594,377 B1 | 7/2003 | Kim et al. | |
| 6,594,399 B1 | 7/2003 | Camus et al. | |
| 6,598,971 B2 | 7/2003 | Cleveland | |
| 6,600,878 B2 | 7/2003 | Pregara | |
| 6,614,919 B1 | 9/2003 | Suzaki et al. | |
| 6,652,099 B2 | 11/2003 | Chae et al. | |
| 6,674,367 B2 | 1/2004 | Sweatte | |
| 6,690,997 B2 | 2/2004 | Rivalto | |
| 6,708,176 B2 | 3/2004 | Strunk et al. | |
| 6,711,562 B1 | 3/2004 | Ross et al. | |
| 6,718,049 B2 | 4/2004 | Pavlidis et al. | |
| 6,718,665 B2 | 4/2004 | Hess et al. | |
| 6,732,278 B2 | 5/2004 | Baird, III et al. | |
| 6,734,783 B1 | 5/2004 | Anbai | |
| 6,745,520 B2 | 6/2004 | Puskaric et al. | |
| 6,750,435 B2 | 6/2004 | Ford | |
| 6,751,733 B1 | 6/2004 | Nakamura et al. | |
| 6,753,919 B1 | 6/2004 | Daugman | |
| 6,754,640 B2 | 6/2004 | Bozeman | |
| 6,760,467 B1 | 7/2004 | Min et al. | |
| 6,765,470 B2 | 7/2004 | Shinzaki | |
| 6,766,041 B2 | 7/2004 | Golden et al. | |
| 6,775,774 B1 | 8/2004 | Harper | |
| 6,785,406 B1 | 8/2004 | Kamada | |
| 6,793,134 B2 | 9/2004 | Clark | |
| 6,819,219 B1 | 11/2004 | Bolle et al. | |
| 6,829,370 B1 | 12/2004 | Pavlidis et al. | |
| 6,832,044 B2 | 12/2004 | Doi et al. | |
| 6,836,554 B1 | 12/2004 | Bolle et al. | |
| 6,837,436 B2 | 1/2005 | Swartz et al. | |
| 6,845,479 B2 | 1/2005 | Illman | |
| 6,853,444 B2 | 2/2005 | Haddad | |
| 6,867,683 B2 | 3/2005 | Calvesio et al. | |
| 6,873,960 B1 | 3/2005 | Wood et al. | |
| 6,896,187 B2 | 5/2005 | Stockhammer | |
| 6,905,411 B2 | 6/2005 | Nguyen et al. | |
| 6,920,237 B2 | 7/2005 | Chen et al. | |
| 6,930,707 B2 | 8/2005 | Bates et al. | |
| 6,934,849 B2 | 8/2005 | Kramer et al. | |
| 6,950,139 B2 | 9/2005 | Fujinawa | |
| 6,954,738 B2 | 10/2005 | Wang et al. | |
| 6,957,341 B2 | 10/2005 | Rice et al. | |
| 6,992,562 B2 * | 1/2006 | Fuks et al. | 340/5.52 |
| 7,071,971 B2 | 7/2006 | Elberbaum | |
| 7,084,904 B2 | 8/2006 | Liu et al. | |
| 7,136,581 B2 | 11/2006 | Fujii | |
| 7,183,895 B2 | 2/2007 | Bazakos et al. | |
| 7,204,425 B2 | 4/2007 | Mosher, Jr. et al. | |
| 7,277,891 B2 * | 10/2007 | Howard et al. | 707/100 |
| 7,298,873 B2 | 11/2007 | Miller, Jr. et al. | |
| 7,315,233 B2 | 1/2008 | Yuhara | |
| 7,362,210 B2 | 4/2008 | Bazakos et al. | |
| 7,362,370 B2 | 4/2008 | Sakamoto et al. | |
| 7,362,884 B2 | 4/2008 | Willis et al. | |
| 7,365,771 B2 | 4/2008 | Kahn et al. | |
| 7,406,184 B2 | 7/2008 | Wolff et al. | |
| 7,414,648 B2 | 8/2008 | Imada | |
| 7,417,682 B2 | 8/2008 | Kuwakino et al. | |
| 7,418,115 B2 | 8/2008 | Northcott et al. | |
| 7,421,097 B2 | 9/2008 | Hamza et al. | |
| 7,443,441 B2 | 10/2008 | Hiraoka | |
| 7,460,693 B2 | 12/2008 | Loy et al. | |
| 7,471,451 B2 | 12/2008 | Dent et al. | |
| 7,486,806 B2 | 2/2009 | Azuma et al. | |
| 7,518,651 B2 | 4/2009 | Butterworth | |
| 7,537,568 B2 | 5/2009 | Moehring | |
| 7,538,326 B2 | 5/2009 | Johnson et al. | |
| 7,580,620 B2 | 8/2009 | Raskar et al. | |
| 7,593,550 B2 | 9/2009 | Hamza | |
| 7,639,846 B2 | 12/2009 | Yoda | |
| 7,751,598 B2 | 7/2010 | Matey et al. | |
| 7,756,301 B2 | 7/2010 | Hamza | |
| 7,756,407 B2 | 7/2010 | Raskar | |
| 7,761,453 B2 | 7/2010 | Hamza | |
| 7,777,802 B2 | 8/2010 | Shinohara et al. | |
| 2001/0026632 A1 | 10/2001 | Tamai | |
| 2001/0027116 A1 | 10/2001 | Baird | |
| 2001/0047479 A1 | 11/2001 | Bromba et al. | |
| 2001/0051924 A1 | 12/2001 | Uberti | |
| 2001/0054154 A1 | 12/2001 | Tam | |
| 2002/0010857 A1 | 1/2002 | Karthik | |
| 2002/0033896 A1 | 3/2002 | Hatano | |
| 2002/0039433 A1 | 4/2002 | Shin | |
| 2002/0040434 A1 | 4/2002 | Elliston et al. | |
| 2002/0062280 A1 | 5/2002 | Zachariassen et al. | |
| 2002/0077841 A1 | 6/2002 | Thompson | |
| 2002/0089157 A1 | 7/2002 | Breed et al. | |
| 2002/0106113 A1 | 8/2002 | Park | |
| 2002/0112177 A1 | 8/2002 | Voltmer et al. | |
| 2002/0114495 A1 | 8/2002 | Chen et al. | |
| 2002/0130961 A1 | 9/2002 | Lee et al. | |
| 2002/0131622 A1 | 9/2002 | Lee et al. | |
| 2002/0139842 A1 | 10/2002 | Swaine | |

| | | | | | | |
|---|---|---|---|---|---|---|
| 2002/0140715 A1 | 10/2002 | Smet | | 2003/0189481 A1* | 10/2003 | Hamid ................. 340/5.53 |
| 2002/0142844 A1 | 10/2002 | Kerr | | 2003/0191949 A1 | 10/2003 | Odagawa |
| 2002/0144128 A1 | 10/2002 | Rahman et al. | | 2003/0194112 A1 | 10/2003 | Lee |
| 2002/0150281 A1 | 10/2002 | Cho | | 2003/0195935 A1 | 10/2003 | Leeper |
| 2002/0154794 A1 | 10/2002 | Cho | | 2003/0198368 A1 | 10/2003 | Kee |
| 2002/0158750 A1 | 10/2002 | Almalik | | 2003/0200180 A1 | 10/2003 | Phelan, III et al. |
| 2002/0164054 A1 | 11/2002 | McCartney et al. | | 2003/0210139 A1 | 11/2003 | Brooks et al. |
| 2002/0175182 A1 | 11/2002 | Matthews | | 2003/0210802 A1 | 11/2003 | Schuessier |
| 2002/0186131 A1 | 12/2002 | Fettis | | 2003/0218719 A1 | 11/2003 | Abourizk et al. |
| 2002/0191075 A1 | 12/2002 | Doi et al. | | 2003/0225711 A1 | 12/2003 | Paping |
| 2002/0191076 A1 | 12/2002 | Wada et al. | | 2003/0228898 A1 | 12/2003 | Rowe |
| 2002/0194128 A1 | 12/2002 | Maritzen et al. | | 2003/0233556 A1 | 12/2003 | Angelo et al. |
| 2002/0194131 A1 | 12/2002 | Dick | | 2003/0235326 A1 | 12/2003 | Morikawa et al. |
| 2002/0198731 A1 | 12/2002 | Barnes et al. | | 2003/0235411 A1 | 12/2003 | Morikawa et al. |
| 2003/0002714 A1 | 1/2003 | Wakiyama | | 2003/0236120 A1 | 12/2003 | Reece et al. |
| 2003/0012413 A1 | 1/2003 | Kusakari et al. | | 2004/0001614 A1 | 1/2004 | Russon et al. |
| 2003/0014372 A1 | 1/2003 | Wheeler et al. | | 2004/0002894 A1 | 1/2004 | Kocher |
| 2003/0020828 A1 | 1/2003 | Ooi et al. | | 2004/0005078 A1 | 1/2004 | Tillotson |
| 2003/0038173 A1 | 2/2003 | Blackson et al. | | 2004/0006553 A1 | 1/2004 | de Vries et al. |
| 2003/0046228 A1 | 3/2003 | Berney | | 2004/0010462 A1 | 1/2004 | Moon et al. |
| 2003/0053663 A1 | 3/2003 | Chen et al. | | 2004/0012760 A1 | 1/2004 | Mihashi et al. |
| 2003/0055689 A1 | 3/2003 | Block et al. | | 2004/0019570 A1 | 1/2004 | Bolle et al. |
| 2003/0055787 A1 | 3/2003 | Fujii | | 2004/0023664 A1 | 2/2004 | Mirouze et al. |
| 2003/0058492 A1 | 3/2003 | Wakiyama | | 2004/0023709 A1 | 2/2004 | Beaulieu et al. |
| 2003/0061172 A1 | 3/2003 | Robinson | | 2004/0025030 A1 | 2/2004 | Corbett-Clark et al. |
| 2003/0061233 A1 | 3/2003 | Manasse et al. | | 2004/0025031 A1 | 2/2004 | Ooi et al. |
| 2003/0065626 A1 | 4/2003 | Allen | | 2004/0025053 A1 | 2/2004 | Hayward |
| 2003/0071743 A1 | 4/2003 | Seah et al. | | 2004/0029564 A1 | 2/2004 | Hodge |
| 2003/0072475 A1 | 4/2003 | Tamori | | 2004/0030930 A1 | 2/2004 | Nomura |
| 2003/0073499 A1 | 4/2003 | Reece | | 2004/0035123 A1 | 2/2004 | Kim et al. |
| 2003/0074317 A1 | 4/2003 | Hofi | | 2004/0037450 A1 | 2/2004 | Bradski |
| 2003/0074326 A1 | 4/2003 | Byers | | 2004/0039914 A1 | 2/2004 | Barr et al. |
| 2003/0076161 A1 | 4/2003 | Tisse | | 2004/0042641 A1 | 3/2004 | Jakubowski |
| 2003/0076300 A1 | 4/2003 | Lauper et al. | | 2004/0044627 A1 | 3/2004 | Russell et al. |
| 2003/0076984 A1 | 4/2003 | Tisse et al. | | 2004/0046640 A1 | 3/2004 | Jourdain et al. |
| 2003/0080194 A1 | 5/2003 | O'Hara et al. | | 2004/0049687 A1 | 3/2004 | Orsini et al. |
| 2003/0091215 A1 | 5/2003 | Lauper et al. | | 2004/0050924 A1 | 3/2004 | Mletzko et al. |
| 2003/0092489 A1 | 5/2003 | Veradej | | 2004/0050930 A1 | 3/2004 | Rowe |
| 2003/0095689 A1 | 5/2003 | Volkommer et al. | | 2004/0052405 A1 | 3/2004 | Walfridsson |
| 2003/0098776 A1 | 5/2003 | Friedli | | 2004/0052418 A1 | 3/2004 | DeLean |
| 2003/0099379 A1 | 5/2003 | Monk et al. | | 2004/0059590 A1 | 3/2004 | Mercredi et al. |
| 2003/0099381 A1 | 5/2003 | Ohba | | 2004/0059953 A1 | 3/2004 | Purnell |
| 2003/0103652 A1 | 6/2003 | Lee et al. | | 2004/0104266 A1 | 6/2004 | Bolle et al. |
| 2003/0107097 A1 | 6/2003 | McArthur et al. | | 2004/0117636 A1 | 6/2004 | Cheng |
| 2003/0107645 A1 | 6/2003 | Yoon | | 2004/0133582 A1* | 7/2004 | Howard et al. ............... 707/100 |
| 2003/0108224 A1 | 6/2003 | Ike | | 2004/0133804 A1 | 7/2004 | Smith et al. |
| 2003/0108225 A1 | 6/2003 | Li | | 2004/0135801 A1 | 7/2004 | Thompson et al. |
| 2003/0115148 A1 | 6/2003 | Takhar | | 2004/0146187 A1 | 7/2004 | Jeng |
| 2003/0115459 A1 | 6/2003 | Monk | | 2004/0148526 A1 | 7/2004 | Sands et al. |
| 2003/0116630 A1 | 6/2003 | Carey et al. | | 2004/0160518 A1 | 8/2004 | Park |
| 2003/0118212 A1 | 6/2003 | Min et al. | | 2004/0162870 A1 | 8/2004 | Matsuzaki et al. |
| 2003/0118217 A1 | 6/2003 | Kondo et al. | | 2004/0162984 A1 | 8/2004 | Freeman et al. |
| 2003/0123711 A1 | 7/2003 | Kim et al. | | 2004/0169817 A1 | 9/2004 | Grotehusmann et al. |
| 2003/0125054 A1 | 7/2003 | Garcia | | 2004/0172541 A1 | 9/2004 | Ando et al. |
| 2003/0125057 A1 | 7/2003 | Pesola | | 2004/0174070 A1 | 9/2004 | Voda et al. |
| 2003/0126560 A1 | 7/2003 | Kurapati et al. | | 2004/0190759 A1 | 9/2004 | Caldwell |
| 2003/0131245 A1 | 7/2003 | Linderman | | 2004/0193893 A1 | 9/2004 | Braithwaite et al. |
| 2003/0131265 A1 | 7/2003 | Bhakta | | 2004/0213437 A1* | 10/2004 | Howard et al. ............... 382/115 |
| 2003/0133597 A1 | 7/2003 | Moore et al. | | 2004/0219902 A1 | 11/2004 | Lee et al. |
| 2003/0140235 A1 | 7/2003 | Immega et al. | | 2004/0233038 A1 | 11/2004 | Beenau et al. |
| 2003/0140928 A1 | 7/2003 | Bui et al. | | 2004/0240711 A1 | 12/2004 | Hamza et al. |
| 2003/0141411 A1 | 7/2003 | Pandya et al. | | 2004/0252013 A1* | 12/2004 | Fuks et al. ............... 340/5.52 |
| 2003/0149881 A1 | 8/2003 | Patel et al. | | 2004/0252866 A1 | 12/2004 | Tisse et al. |
| 2003/0152251 A1 | 8/2003 | Ike | | 2004/0255168 A1 | 12/2004 | Murashita et al. |
| 2003/0152252 A1 | 8/2003 | Kondo et al. | | 2005/0008200 A1 | 1/2005 | Azuma et al. |
| 2003/0156741 A1 | 8/2003 | Lee et al. | | 2005/0008201 A1 | 1/2005 | Lee et al. |
| 2003/0158762 A1 | 8/2003 | Wu | | 2005/0012817 A1 | 1/2005 | Hampapur et al. |
| 2003/0158821 A1 | 8/2003 | Maia | | 2005/0029353 A1 | 2/2005 | Isemura et al. |
| 2003/0159051 A1 | 8/2003 | Hollnagel | | 2005/0055582 A1 | 3/2005 | Bazakos et al. |
| 2003/0163739 A1 | 8/2003 | Armington et al. | | 2005/0063567 A1 | 3/2005 | Saitoh et al. |
| 2003/0169334 A1 | 9/2003 | Braithwaite et al. | | 2005/0084137 A1 | 4/2005 | Kim et al. |
| 2003/0169901 A1 | 9/2003 | Pavlidis et al. | | 2005/0084179 A1 | 4/2005 | Hanna et al. |
| 2003/0169907 A1 | 9/2003 | Edwards et al. | | 2005/0099288 A1 | 5/2005 | Spitz et al. |
| 2003/0173408 A1 | 9/2003 | Mosher, Jr. et al. | | 2005/0102502 A1 | 5/2005 | Sagen |
| 2003/0174049 A1 | 9/2003 | Beigel et al. | | 2005/0110610 A1 | 5/2005 | Bazakos et al. |
| 2003/0177051 A1 | 9/2003 | Driscoll et al. | | 2005/0125258 A1 | 6/2005 | Yellin et al. |
| 2003/0182151 A1 | 9/2003 | Taslitz | | 2005/0127161 A1 | 6/2005 | Smith et al. |
| 2003/0182182 A1 | 9/2003 | Kocher | | 2005/0129286 A1 | 6/2005 | Hekimian |
| 2003/0189480 A1* | 10/2003 | Hamid ................. 340/5.52 | | 2005/0134796 A1 | 6/2005 | Zelvin et al. |

| | | | | | | |
|---|---|---|---|---|---|---|
| 2005/0138385 A1 | 6/2005 | Friedli et al. | | JP | 10137222 | 5/1998 |
| 2005/0138387 A1 | 6/2005 | Lam et al. | | JP | 10137223 | 5/1998 |
| 2005/0151620 A1 | 7/2005 | Neumann | | JP | 10248827 | 9/1998 |
| 2005/0152583 A1 | 7/2005 | Kondo et al. | | JP | 10269183 | 10/1998 |
| 2005/0163362 A1 | 7/2005 | Jones et al. | | JP | 11047117 | 2/1999 |
| 2005/0193212 A1 | 9/2005 | Yuhara | | JP | 11089820 | 4/1999 |
| 2005/0199708 A1 | 9/2005 | Friedman | | JP | 11200684 | 7/1999 |
| 2005/0206501 A1 | 9/2005 | Farhat | | JP | 11203478 | 7/1999 |
| 2005/0206502 A1 | 9/2005 | Bernitz | | JP | 11213047 | 8/1999 |
| 2005/0207614 A1 | 9/2005 | Schonberg et al. | | JP | 11339037 | 12/1999 |
| 2005/0210267 A1 | 9/2005 | Sugano et al. | | JP | 2000005149 | 1/2000 |
| 2005/0210270 A1 | 9/2005 | Rohatgi et al. | | JP | 2000005150 | 1/2000 |
| 2005/0210271 A1 | 9/2005 | Chou et al. | | JP | 2000011163 | 1/2000 |
| 2005/0238214 A1 | 10/2005 | Matsuda et al. | | JP | 2000023946 | 1/2000 |
| 2005/0240778 A1 | 10/2005 | Saito | | JP | 2000083930 | 3/2000 |
| 2005/0248725 A1 | 11/2005 | Ikoma et al. | | JP | 2000102510 | 4/2000 |
| 2005/0249385 A1 | 11/2005 | Kondo et al. | | JP | 2000102524 | 4/2000 |
| 2005/0255840 A1 | 11/2005 | Markham | | JP | 2000105830 | 4/2000 |
| 2006/0093190 A1 | 5/2006 | Cheng et al. | | JP | 2000107156 | 4/2000 |
| 2006/0147094 A1 | 7/2006 | Yoo | | JP | 2000139878 | 5/2000 |
| 2006/0165266 A1 | 7/2006 | Hamza | | JP | 2000155863 | 6/2000 |
| 2006/0274919 A1 | 12/2006 | LoIacono et al. | | JP | 2000182050 | 6/2000 |
| 2007/0140531 A1 | 6/2007 | Hamza | | JP | 2000185031 | 7/2000 |
| 2007/0160266 A1 | 7/2007 | Jones et al. | | JP | 2000194972 | 7/2000 |
| 2007/0189582 A1 | 8/2007 | Hamza et al. | | JP | 2000237167 | 9/2000 |
| 2007/0206840 A1 | 9/2007 | Jacobson | | JP | 2000242788 | 9/2000 |
| 2007/0211924 A1 | 9/2007 | Hamza | | JP | 2000259817 | 9/2000 |
| 2007/0274570 A1 | 11/2007 | Hamza | | JP | 2000356059 | 12/2000 |
| 2007/0274571 A1 | 11/2007 | Hamza | | JP | 2000357232 | 12/2000 |
| 2007/0286590 A1 | 12/2007 | Terashima | | JP | 2001005948 | 1/2001 |
| 2008/0005578 A1* | 1/2008 | Shafir ............................ 713/186 | | JP | 2001067399 | 3/2001 |
| 2008/0015004 A1* | 1/2008 | Gatto et al. ..................... 463/16 | | JP | 2001101429 | 4/2001 |
| 2008/0075334 A1 | 3/2008 | Determan et al. | | JP | 2001167275 | 6/2001 |
| 2008/0075441 A1 | 3/2008 | Jelinek et al. | | JP | 2001222661 | 8/2001 |
| 2008/0104415 A1* | 5/2008 | Palti-Wasserman et al. . 713/186 | | JP | 2001292981 | 10/2001 |
| 2008/0148030 A1* | 6/2008 | Goffin .............................. 713/1 | | JP | 2001297177 | 10/2001 |
| 2008/0211347 A1 | 9/2008 | Wright et al. | | JP | 2001358987 | 12/2001 |
| 2008/0252412 A1* | 10/2008 | Larsson et al. .................. 340/5.2 | | JP | 2002119477 | 4/2002 |
| 2008/0267456 A1 | 10/2008 | Anderson | | JP | 2002133415 | 5/2002 |
| 2009/0046899 A1 | 2/2009 | Northcott et al. | | JP | 2002153444 | 5/2002 |
| 2009/0092283 A1 | 4/2009 | Whillock et al. | | JP | 2002260071 | 9/2002 |
| 2009/0316993 A1 | 12/2009 | Brasnett et al. | | JP | 2002271689 | 9/2002 |
| 2010/0002913 A1 | 1/2010 | Hamza | | JP | 2002286650 | 10/2002 |
| 2010/0033677 A1 | 2/2010 | Jelinek | | JP | 2002312772 | 10/2002 |
| 2010/0034529 A1 | 2/2010 | Jelinek | | JP | 2002329204 | 11/2002 |
| 2010/0142765 A1 | 6/2010 | Hamza | | JP | 2003006628 | 1/2003 |
| 2010/0182440 A1 | 7/2010 | McCloskey | | JP | 2003036434 | 2/2003 |
| 2010/0239119 A1 | 9/2010 | Bazakos et al. | | JP | 2003108720 | 4/2003 |
| | | | | JP | 2003108983 | 4/2003 |
| FOREIGN PATENT DOCUMENTS | | | | JP | 2003132355 | 5/2003 |
| EP | 0593386 | 4/1994 | | JP | 2003150942 | 5/2003 |
| EP | 0878780 | 11/1998 | | JP | 2003153880 | 5/2003 |
| EP | 0899680 | 3/1999 | | JP | 2003242125 | 8/2003 |
| EP | 0962894 | 12/1999 | | JP | 2003271565 | 9/2003 |
| EP | 1018297 | 7/2000 | | JP | 2003271940 | 9/2003 |
| EP | 1024463 | 8/2000 | | JP | 2003308522 | 10/2003 |
| EP | 1028398 | 8/2000 | | JP | 2003308523 | 10/2003 |
| EP | 1041506 | 10/2000 | | JP | 2003317102 | 11/2003 |
| EP | 1041523 | 10/2000 | | JP | 2003331265 | 11/2003 |
| EP | 1126403 | 8/2001 | | JP | 2004005167 | 1/2004 |
| EP | 1139270 | 10/2001 | | JP | 2004021406 | 1/2004 |
| EP | 1237117 | 9/2002 | | JP | 2004030334 | 1/2004 |
| EP | 1635307 | 3/2006 | | JP | 2004038305 | 2/2004 |
| GB | 2369205 | 5/2002 | | JP | 2004094575 | 3/2004 |
| GB | 2371396 | 7/2002 | | JP | 2004152046 | 5/2004 |
| GB | 2402840 | 12/2004 | | JP | 2004163356 | 6/2004 |
| GB | 2411980 | 9/2005 | | JP | 2004164483 | 6/2004 |
| JP | 9161135 | 6/1997 | | JP | 2004171350 | 6/2004 |
| JP | 9198545 | 7/1997 | | JP | 2004171602 | 6/2004 |
| JP | 9201348 | 8/1997 | | JP | 2004206444 | 7/2004 |
| JP | 9147233 | 9/1997 | | JP | 2004220376 | 8/2004 |
| JP | 9234264 | 9/1997 | | JP | 2004261515 | 9/2004 |
| JP | 9305765 | 11/1997 | | JP | 2004280221 | 10/2004 |
| JP | 9319927 | 12/1997 | | JP | 2004280547 | 10/2004 |
| JP | 10021392 | 1/1998 | | JP | 2004287621 | 10/2004 |
| JP | 10040386 | 2/1998 | | JP | 2004315127 | 11/2004 |
| JP | 10049728 | 2/1998 | | JP | 2004318248 | 11/2004 |
| JP | 10137219 | 5/1998 | | JP | 2005004524 | 1/2005 |
| JP | 10137221 | 5/1998 | | JP | 2005011207 | 1/2005 |

| | | |
|---|---|---|
| JP | 2005025577 | 1/2005 |
| JP | 2005038257 | 2/2005 |
| JP | 2005062990 | 3/2005 |
| JP | 2005115961 | 4/2005 |
| JP | 2005148883 | 6/2005 |
| JP | 2005242677 | 9/2005 |
| WO | WO 97/17674 | 5/1997 |
| WO | WO 97/21188 | 6/1997 |
| WO | WO 98/02083 | 1/1998 |
| WO | WO 98/08439 | 3/1998 |
| WO | WO 99/32317 | 7/1999 |
| WO | WO 99/52422 | 10/1999 |
| WO | WO 99/65175 | 12/1999 |
| WO | WO 00/28484 | 5/2000 |
| WO | WO 00/29986 | 5/2000 |
| WO | WO 00/31677 | 6/2000 |
| WO | WO 00/36605 | 6/2000 |
| WO | WO 00/62239 | 10/2000 |
| WO | WO 01/01329 | 1/2001 |
| WO | WO 01/03100 | 1/2001 |
| WO | WO 01/28476 | 4/2001 |
| WO | WO 01/35348 | 5/2001 |
| WO | WO 01/35349 | 5/2001 |
| WO | WO 01/63994 | 8/2001 |
| WO | WO 01/69490 | 9/2001 |
| WO | WO 01/86599 | 11/2001 |
| WO | WO 02/01451 | 1/2002 |
| WO | WO 02/35452 | 5/2002 |
| WO | WO 02/35480 | 5/2002 |
| WO | WO 02/095657 | 11/2002 |
| WO | WO 03/002387 | 1/2003 |
| WO | WO 03/003910 | 1/2003 |
| WO | WO 03/054777 | 7/2003 |
| WO | WO 03/077077 | 9/2003 |
| WO | WO 2004/029863 | 4/2004 |
| WO | WO 2004/042646 | 5/2004 |
| WO | WO 2004/055737 | 7/2004 |
| WO | WO 2004/089214 | 10/2004 |
| WO | WO 2004/097743 | 11/2004 |
| WO | WO 2005/008567 | 1/2005 |
| WO | WO 2005/013181 | 2/2005 |
| WO | WO 2005/024708 | 3/2005 |
| WO | WO 2005/024709 | 3/2005 |
| WO | WO 2005/029388 | 3/2005 |
| WO | WO 2005/062235 | 7/2005 |
| WO | WO 2005/069252 | 7/2005 |
| WO | WO 2005/093510 | 10/2005 |
| WO | WO 2005/093681 | 10/2005 |
| WO | WO 2005/096962 | 10/2005 |
| WO | WO 2005/098531 | 10/2005 |
| WO | WO 2005/104704 | 11/2005 |
| WO | WO 2005/109344 | 11/2005 |
| WO | WO 2006/012645 | 2/2006 |
| WO | 2006051462 | 5/2006 |
| WO | WO 2006/081209 | 8/2006 |
| WO | WO 2006/081505 | 8/2006 |
| WO | WO 2007/101269 | 9/2007 |
| WO | WO 2007/101275 | 9/2007 |
| WO | WO 2007/101276 | 9/2007 |
| WO | WO 2007/103698 | 9/2007 |
| WO | WO 2007/103701 | 9/2007 |
| WO | WO 2007/103833 | 9/2007 |
| WO | WO 2007/103834 | 9/2007 |
| WO | WO 2008/016724 | 2/2008 |
| WO | WO 2008/019168 | 2/2008 |
| WO | WO 2008/019169 | 2/2008 |
| WO | WO 2008/021584 | 2/2008 |
| WO | WO 2008/031089 | 3/2008 |
| WO | WO 2008/040026 | 4/2008 |

OTHER PUBLICATIONS

Camus et al., "Reliable and Fast Eye Finding in Close-up Images," IEEE, pp. 389-394, 2002.
Cui et al., "A Fast and Robust Iris Localization Method Based on Texture Segmentation," 8 pages, 2004.
Cui et al., "An Appearance-Based Method for Iris Detection," 6 pages, 2004.
Cui et al., "An Iris Detection Method Based on Structure Information," Advances in Biometric Person Authentication, International Workshop on Biometric Recognition Systems, IWBRS 2005, Beijing China, 10 pages, Oct. 22-23, 2005.
Cui et al., "An Iris Image Synthesis Method Based on PCA and Super-Resolution," IEEE Computer Society, Proceedings of the 17th International Conference on Pattern Recognition, 6 pages, Aug. 23-26, 2004.
Cui et al., "An Iris Recognition Algorithm Using Local Extreme Points," Biometric Authentication, First International Conference, ICBA 2004, Hong Kong, China, 10 pages, Jul. 15-17, 2004.
Daugman, "Results From 200 Billion Iris Cross-Comparisons," University of Cambridge Computer Laboratory, Technical Report, No. 635, 8 pages, Jun. 2005.
Du et al., "A One-Dimensional Approach for Iris Identification," 11 pages, prior to Jan. 25, 2006.
http://www.newscientisttech.com/article/dn11110-invention-covert-iris-sc, "Invention: Covert Iris Scanner," 3 pages, printed Feb. 8, 2007.
Huang et al., "Iris Model Based on Local Orientation Description," 5 pages, prior to Jan. 25, 2006.
Huang et al., "An Efficient Iris Recognition System," IEEE Proceedings of the First International Conference on Machine Learning and Cybernetics, Beijing, pp. 450-454, Nov. 4-5, 2002.
Ma et al., "Personal Identification Based on Iris Texture Analysis," IEEE Transactions on Pattern Analysis and Machine Intelligence, vol. 25, No. 12, pp. 1519-1533, Dec. 2003.
Masek, "Recognition of Human Iris Patterns for Biometric Identification," 61 pages, 2003.
Sun et al., "Robust Encoding of Local Ordinal Measures: A General Framework of Iris Recognition," 13 pages, prior to Jan. 25, 2006.
AOptix Technologies, "Introducing the AOptix InSight 2 Meter Iris Recognition System," 6 pages, 2010.
Belhumeur et al., "Eigenfaces Vs. Fisherfaces: Recognition Using Class Specific Linear Projection," 14 pages, prior to Jun. 11, 2010.
Bentley et al., "Multidimensional Binary Search Trees Used for Associative Searching," Communications of the ACM, vol. 18, No. 9, pp. 509-517, Sep. 1975.
Blackman et al., "Chapter 9, Multiple Sensor Tracking: Issues and Methods," Design and Analysis of Modern Tracking Systems, Artech House, pp. 595-659, 1999.
Brasnett et al., "A Robust Visual Identifier Using the Trace Transform," 6 pages, prior to Jun. 11, 2010.
Buades et al., "A Review of Image Denoising Algorithms, with a New One, Multiscale Modeling & Simulation," vol. 4, No. 2, pp. 490-530, 2005.
Chen et al., "Localized Iris Image Quality Using 2-D Wavelets," LNCS vol. 3832, pp. 373-381, 2005.
Chow et al., "Towards a System for Automatic Facial Feature Detection," Pattern Recognition vol. 26, No. 12, pp. 1739-1755, 1993.
U.S. Appl. No. 12/792,498, filed Jun. 2, 2010.
U.S. Appl. No. 12/814,232, filed Jun. 11, 2010.
U.S. Appl. No. 12/814,272, filed Jun. 11, 2010.
U.S. Appl. No. 12/875,372, filed Sep. 3, 2010.
Cula et al., "Bidirectional Imaging and Modeling of Skin Texture," Proceedings of Texture 2003, 6 pages, Oct. 17, 2003.
Cula et al., "Bidirectional Imaging and Modeling of Skin Texture," IEEE Transactions on Biomedical Engineering, vol. 51, No. 12, pp. 2148-2159, 2004.
Cula et al., "Compact Representation of Bidirectional Texture Functions," Proceedings of IEEE Computer Society Conference on Computer Vision and Pattern Recognition 2001, 8 pages, 2001.
Cula et al., "Skin Texture Modeling," International Journal of Computer Vision 2004, 34 pages, 2004.
Dabov et al., "Image Denoising by Sparse 3-D Transform-Domain Collaborative Filtering," IEEE Transactions on Image Processing, vol. 16, No. 8, pp. 2080-2095, Aug. 2007.
Dabov et al., "Image Restoration by Spars 3D Transform Collaborative Filtering," SPIE vol. 6812 681207-1, 12 pages, 2008.
Daugman, "High Confidence Visual Recognition of Persons by a Test of Statistical Independence," IEEE Transactions on Pattern Analysis and Machine Intelligence, vol. 15, No. 11, pp. 1148-1161, 1993.

Daugman, "Probing the Uniqueness and Randomness of Iris Codes: Results from 200 Billion Iris Pair Comparisons," Proceedings of the IEEE vol. 94, No. 11, pp. 1928-1935, Nov. 2006.

Fooprateepsiri et al., "A Highly Robust Method for Face Authentication," IEEE 2009 First Asian Conference on Intelligent Information and Database Systems, pp. 380-385, 2009.

Fooprateepsiri et al., "Face Verification Base-On Hausdorff-Shape Context," IEEE 2009 Asia Conference on Informatics in Control, Automation and Robotics, pp. 240-244, 2009.

Forstner et al., "A Metric for Covariance Matrices," 16 pages, prior to Jun. 11, 2010.

Gan et al., "Applications of Wavelet Packets Decomposition in Iris Recognition," LNCS vol. 3832, pp. 443-449, 2005.

Hampapur et al., "Smart Surveillance: Applications, Technologies and Implications," IEEE, 6 pages, Dec. 15-18, 2003.

Hamza et al., "Standoff Iris Recognition Usin Non-Iterative Polar Based Segmentation," Proceedings of SPIE vol. 6944, 8 pages, 2008.

Hanna et al., "A System for Non-Intrusive Human Iris Acquisition and Identification," IAPR Workshop on Machine Vision Applications, pp. 200-203, Nov. 12-14, 1996.

http://en.wikipedia.org/wiki/Radon_transform, "Radon Transform," 5 pages, printed May 14, 2010.

Ivins et al., "A Deformable Model of the Human Iris for Measuring Small Three-Dimensional Eye Movements," Machine Vision and Applications, vol. 11, pp. 42-51, 1998.

Kadyrov et al., "The Trace Transform and Its Applications," IEEE Transactions on Pattern Analysis and Machine Intelligence, vol. 23, No. 8, pp. 811-828, Aug. 2001.

Kadyrov et al., "The Trace Transform as a Tool to Invariant Feature Construction," 3 pages, prior to Jun. 11, 2010.

Kang et al., "Improved Dual Action Contour for Iris Recognition," 10 pages, prior to Jun. 11, 2010.

Kawaguchi et al., "Detection of Eyes from Human Faces by Hough Transform and Separability Filter," IEEE, 4 pages, 2000.

Kong et al., "Detecting Eyelash and Reflection for Accurate Iris Segmentation," International Journal of Pattern Recognition and Artificial Intelligence, vol. 17, No. 6, pp. 1025-1034, 2003.

Li et al., "Appearance Modeling Using a Geometric Transform," IEEE Transactions on Image Processing, 17 pages, 2008.

Li et al., "Appearance Modeling Using a Geometric Transform," Journal Preparation for IEEE Transactions on Image Processing, 30 pages, Nov. 5, 2006.

Ma et al., "Local Intensity Variation Analysis for Iris Recognition," Pattern Recognition, vol. 37, pp. 1287-1298, 2004.

Ma et al., "Video Sequence Querying Using Clustering of Objects' Appearance Models," Advances in Visual Computing Third Annual Sympsosium, ISVC 2007, 14 pages, 2007.

Monro et al., "DCT-Based Iris Recognition," IEEE Transactions on Pattern Analysis and Machine Intelligence, vol. 29, No. 4, Apr. 2007.

Noh et al., "A Novel Method to Extract Features for Iris Recognition System," AVBPA 2003, LNCS 2688, pp. 862-868, 2003.

Ojala et al., "Multiresolution Gray-Scale and Rotation Invariant Texture Classification with Local Binary Patterns," IEEE Transactions on Pattern Analysis and Machine Intelligence, vol. 24, No. 7, 18 pages, Jul. 2002.

Pamudurthy et al., "Dynamic Approach for Face Recognition Using Digital Image Skin Correlation," Audio and Video Based Person Authentication 5th International Conference, AVBPA 2005, Hilton Rye Town, NY, USA, 11 pages, Jul. 20-22, 2005.

Petrou et al., "The Trace Transform in a Nutshell," 9 pages, prior to Jun. 11, 2010.

Phillips et al., "FRVT 2006 and ICE 2006 Large-Scale Results," 56 pages, Mar. 2007.

Porikli et al., "Covariance Tracking Using Model Update Based on Means on Riemannian Manifolds," 8 pages, prior to Jun. 11, 2010.

Proenca et al., "Toward Noncooperative Iris Recognition: A Classification Approach Using Multiple Signatures," IEEE Transactions on Patern Analysis and Machine Intellingence, vol. 29, No. 4, pp. 607-612, Apr. 2007.

Ross et al., "Segmenting Non-Ideal Irises Using Geodesic Active Contours," IEEE 2006 Biometrics Symposium, 3 pages, 2006.

Shapiro et al., pp. 556-559 in Book Entitled "Computer Vision," Prentice Hall, prior to June11, 2010.

Stillman et al., "A System for Tracking and Recognizing Multiple People with Multiple Cameras," 6 pages, Aug. 1998.

Sun et al., "Iris Recognition Based on Non-local Comparisons," Sinobiometrics 2004, LNCS 3338, pp. 67-77, 2004.

Suzaki et al., "A Horse Identification System Using Biometrics," Systems and Computer in Japan, vol. 32, No. 14, pp. 12-23, 2001.

Trucco et al., "Robust Iris Location in Close-up Images of the Eye," Pattern Anal. Applic. vol. 8, pp. 247-255, 2005.

Turan et al., "Trace Transform Based Invariant Object Recognition System," 4 pages, prior to Jun. 11, 2010.

Turk et al., "Eigenfaces for Recognition," Journal of Cognitive Neuroscience, vol. 3, No. 1, 16 pages, 1991.

Wang et al., "Recent Developments in Human Motion Analysis," Pattern Recognition, vol. 36, pp. 585-601, 2003.

Wei et al., "Robust and Fast Assessment of Iris Image Quality," LNCS vol. 3832, pp. 464-471, 2005.

Zhao et al., "Dynamic Texture Recognition Using Local Binary Patterns with an Application to Facial Expressions," IEEE Transactions on Pattern Analysis and Machine Intelligence, vol. 29, No. 6, pp. 915-928, Jun. 2007.

Zhi-Hui et al., "Research Iris Serial Images Quality Assessment Method Based on HVS," Proceedings of SPIE, vol. 6034, 6 pages, 2006.

U.S. Appl. No. 13/077,821 filed Mar. 30, 2011.

Freeboy, "Adaptive Optics Speeds Up Airport Immigration," Optics. org/ole, 2 pages, Jan. 2009.

http://www.imagine-eyes.com/content/view/100/115/, "INOVEO—Ultra-High Resolution Retinal Imaging with Adaptive Optics," 2 pages, printed Feb. 22, 2010.

* cited by examiner

BIOMETRIC DATA COLLECTION SYSTEM

BACKGROUND

The present invention pertains to sensors and particularly to biometric sensors. More particularly, the invention pertains to collection of biometric data.

SUMMARY

The invention is a system collects biometric data from a user of a touch screen.

DESCRIPTION

Figure 1:
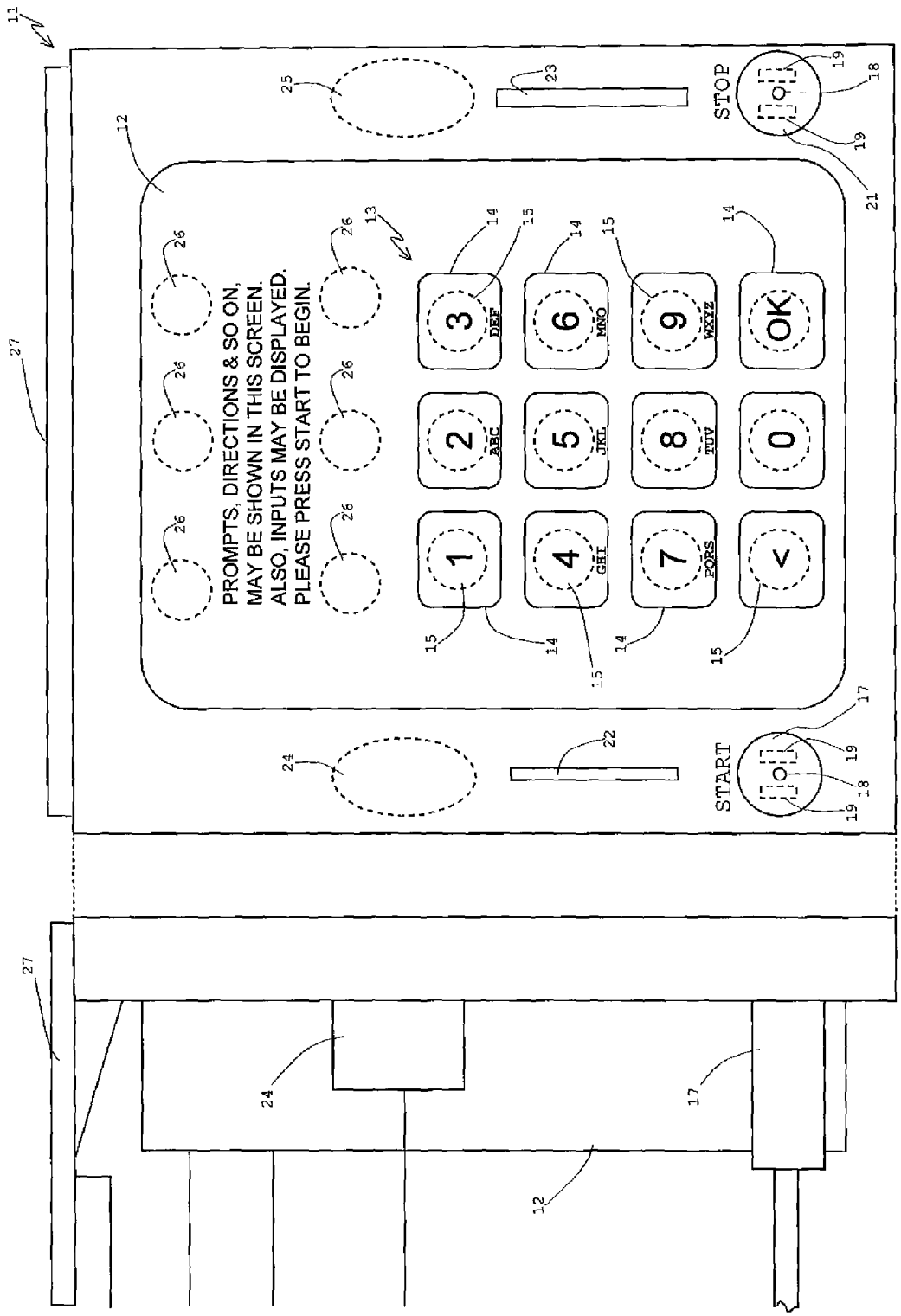
FIG. 1 is a diagram of a user interface for a biometric collection system.

The invention is a system for collecting biometric information with touch screen and detection technology. At some points of entry such as international airports, customs, port authorities, border crossings, money-supplying bank kiosks, admission to secure areas, it is important to positively identify the person seeking entry. The present system may use a series of techniques for identifying such a person.

Touch screens, touch panels and touch screen panels may be display overlays which have the capability to receive and display information on the same screen. The effect of such overlays allows a display to be an input device, removing a need for the keyboard and/or the mouse as the primary input device for interacting with the display's content. Such displays may be connected to computers, terminals, networks, and the like.

In the case of seeking admission or entry to an area or acceptance to receive valuables or assets, the person may be required to use a touch screen. When using the touch screen, the person may need to enter information, by touching the screen in designated spots to communicate with the system. The technology of the touch screen may be one of various kinds. At the time of entering information at the screen, significant amounts of biometric information about and of the person may be collected. Such information may be acted upon, such as with searching and comparison with databases, and processing in seeking an independent verification of identity of the person operating the touch screen.

The system may collect information of the person at the touch screen in multiple ways. Some of these ways may include cameras behind the display, scanning the touch screen, or embedding sensors behind the text or buttons displayed on the touch screen.

There may be sound detection device or devices hidden in the screen or proximate to the screen which may detect a user's voice or other associated sound such as a companion's voice, or other sorts of sounds. The sound detection device may be connected to a voice recognition system for analysis and possible identification. The detected sounds may be recorded and placed in a database for future reference or identification. There may be a speaker device, as may be appropriate to the present system, for voice communication with the user for obtaining information that may otherwise not be obtainable from the user. Such communication may be helpful in attaining a good voiceprint of the user. However, a speaker might not necessarily be used or included in the present system.

The system may include one or more cameras behind a film of the touch screen which cannot be seen by the user. The camera may take images of the person for face and iris recognition. The camera may also take images of print impressions of fingers that touch the screen. The camera may detect visible and/or infrared images. Such images maybe indicate if portions of the purported user are actual skin, flesh, disguise, makeup, and so on. There may multiple cameras which may take sculptural three-dimensional profiles of the user. The camera images may then be processed for identification of the person using the display. Also, such images may be entered in a database for future reference. Also, there may be spectrometric type detectors and/or cameras that may attain chemical information from of the user's face and/or other portions of the user's body. In some systems, the touch screen may have devices behind the screen may emanate and detect returns of certain forms radiation, such as RF, ultrasound, and the like, with the user being a target of interest. These radiative approaches may provide various sorts of information about the user such as imagery which may reveal hidden weapons and explosives, drugs, and other items of concern.

Another approach is to scan the touch screen itself after the user has touched the screen. This approach may sense the finger, scan the film of the touch screen, subtract the previous image and then process the resulting image for identification information. One technique may include placing imagers behind text or software buttons that appear on the screen which would be pressed by the user. This technique may capture multiple images depending on the number of buttons or an amount of text that the user would need to touch to achieve the goal which brought the user to the touch screen in the first place. These images may be processed for identification and information collection purposes. Other information may be collected from a card or cards that are inserted into a slot or slots, and scanned by readers that are proximate to the display. The readers may be technologically capable of reading cards inserted with various orientations, e.g., a strip on the card need not necessarily be facing one way or the other to be read. The user may be asked to place identification cards, driver's licenses, passports and/or other pertinent documentation on a horizontal surface at the top of the touch screen for examination and/or scanning. Requesting the user to hold such documentation in front of the touch screen for review and/or scanning may inform the user that undesired surveillance is in process and thus frighten the user away from providing other requested information which could reduce the system's effectiveness for biometric data collection.

Also, there may be a start, stop and/or other kind of button or mechanism requiring some physical interaction by the user which may result in a collection of a DNA sample from the user. The may be a hole in the middle of the button that may suck particles from the pressing finger or a glove of the finger. Some of these particles may also reveal one or more constituents of explosives, drugs, or other items of concern associated with the user. Also, there may be set of conductors embedded in the button to measure resistance or other property of the skin on the finger or material of a glove. It may be such that the button measures one or parameters to determine whether whatever is pressing the button could be skin or flesh, in that it will not operate if skin or flesh of a finger is not detected. That may help assure that fingerprints will be available for collection on the touch screen. Some of these buttons or mechanisms within or proximate to the touch screen may obtain certain chemical properties of the person's skin, flesh, breath and/or the like, which may provide information about blood type, level of intoxication or chemical dependency, and so forth. The various kinds of data collected by the present system may be brought together to deduce and infer additional information about the user.

The data collection may be short-term and utilized for just identification at the moment of user's interaction with the touch screen, or the collection may be a basis for building an identification database or databank, and/or for long-term storage and analysis. The present system may detect a user who is attempting to provide false identification and/or information. The collection of such data and associated activities may be covert, partially covert, or not covert. Incidentally, there may be laws in certain jurisdictions that regulate the collection and use of certain kinds of biometric data.

FIG. 1 is a diagram showing front and side views of a biometric data collection instrument 11 having an illustrative example of a touch screen 12 of the present collection system. The touch screen 12 may display various items pertinent to the present system. For instance, the screen may display a numerical keyboard 13 on which a user may provide numerical information. The numeric portion of the keyboard 13 may be similar to that of a standard telephone. Also, alphabetic information may be entered by the user via keys 14 of the keyboard 13 using certain directives responding to prompts for such entries. Instead, in lieu of the keyboard 13, a more extensive alphanumeric keyboard may be displayed. An example may be one having a standard typewriter key layout.

Returning to keyboard 13 as an illustrative example for the present system, each key 14 may be designed to retrieve information from a finger pressing it. There may be a device 15 such as a sensor, camera, imager or scanner situated or embedded behind each displayed key 14 for obtaining fingerprint information from the finger pressing the respective key. The device 15 may be a combination that includes a camera, sensor, image, scanner or other detection mechanism behind the keys 14 of keyboard 13. The screen 12 may provide visible information to the user relative to operation of the touch screen to apply for and obtain admission, permission or the like, so that the user may proceed to a desired destination or goal.

The bottom row of keys 14 may have a "<" symbol for backing up or return in a procedure by the user on the screen 12. An "OK" key 14 may be pressed by the user to accept the entered information and to move forward with the procedure on the screen. These keys 14 and other keys 14 may used to achieve other actions on the touch screen.

There may instructive text 16 on the screen for the user which may be changed or scrolled by or for the user. The whole touch screen may change in appearance with the displaying of more or less text, with another or no keyboard, with illustrations, photos, video, animated pictures, and other items pertinent to the present system.

The instrument 11 may have a start button 17 that may have to be pressed by the user to start the procedure of the system. The button 17 may have a hole 18 for collecting particles from the user. Button 17 may also have a set of electrodes 19 that may measure resistance, impedance or other properties of a finger of the user touching or pressing the button 17. The electrodes may actually be touched by the finger or be capacitively coupled to the finger. A stop button 21 may be pressed by the user to stop, cancel, pause, or the like, of the procedure, entry, or steps taken by the user of the instrument 11.

There may be a slot 22 for inserting identity, credit or other types of cards. Instrument 11, for instance, may used in conjunction with a cash machine, entry into a building, besides the other purposes mentioned herein. The slot 22 may have a reader for reading various kinds of formats from magnetic, optical, or the like, strips on the card. The card may have a smart chip which may communicate with the reader of slot 22. There may a second slot 23 of a different or the same size on the instrument 11. This slot 23 may have a reader like that of the reader of slot 22. Alternatively, slot 23 may have a different reader with other capabilities than those of the reader for slot 22.

Instrument 11 may have a microphone, sound sensor or device 24 for obtaining voice sounds from the user for purposes of taking voice prints of the user. It may be used for obtaining information from the user as prompted by text 16 in screen 12. Device 24 may also incorporate a speaker in the event there is reason for an operator of the system to speak to the user under certain applications of the present system. Device 24 may be concealed from the user.

There may be another sound device 25 on instrument 11 which may also receive and/or provide an audio type of information to the user. Sound device 25 may include a speaker and microphone. The microphones of device 24 and 25 may be operate in conjunction with each other to electronically and computationally to reduce background noise at the instrument 11. Also, the speakers of devices 24 and 25 may be used to provide a high quality audio directionally directed solely at the user for clarity of understanding without interruption relative to the environment about the instrument 11, especially if there are other instruments 11 in use in the proximity of the present instrument 11. Devices 24 and 25 may also have ultrasound transmitters and receivers for certain kinds of detection of the user. The pair of devices 24 and 25 may be able to provide depth, distance and stereo-type detection.

The touch screen 12 may have various kinds of cameras, visible and invisible light detection and transmission devices 26. Devices 26 may be able to take pictures and video of the user through the screen of display 12.

Devices 26 may be hidden and not detectable by the user. Thus, images of the user may be obtained without the user being aware of such image acquisition. The video may be recorded along with sound from devices 24 and/or 25. The cameras among devices 26 may have directional and zooming capabilities. Infrared images may be taken of the user to detect the areas of exposed flesh on the user. One reason for such detection is to note possible disguises of the user. Three dimensional images may be taken for the user for reasons of good depiction of various features of the user. Also, there may be wide angle devices 26 for attaining images of the full body of the user. Also, there may be high resolution and variable zoom cameras for obtaining images of the user's eyes, including quality images of the iris of at least one eye. There may be spectrometric devices 26 for obtaining information about the user's physical makeup. Also, as a top part of instrument 11 may be a scanner 27 for scanning documents from the user, such as identification papers and the like.

Figure 2:
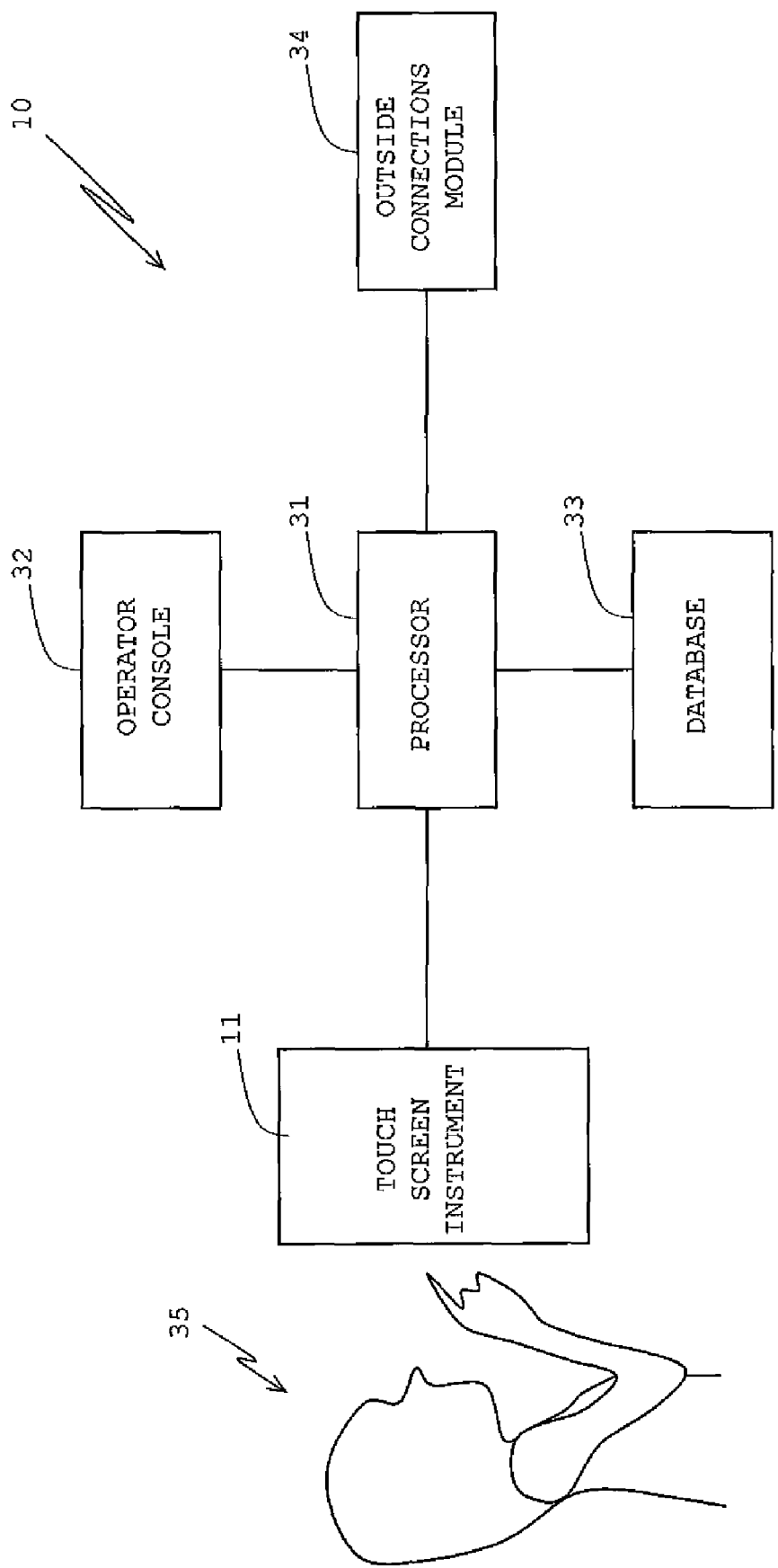
FIG. 2 is a diagram of the biometric collection system layout.

FIG. 2 is a block diagram of a touch screen system 10. The touch screen instrument 11 may be connected to a processor 31. Processor 31, for the mechanisms and devices described herein, may contain the electronics and software for operating the touch screen 12, the touch screen input mechanism including display 13, sensors 15 for finger print scanning and reading, the cameras, emitters and sensors 26 for face, iris, skin detection, analysis and recognition, voice recognition and sound analysis mechanisms in connection with microphones and sound emitters 24 and 25, card readers 22 and 23, collection mechanisms 18 and electrodes 19 associated with the start 17 and stop 21 buttons, document scanner 27, in/out interfaces, and other items pertinent to the operation of system 10.

A user 35 may interact with the touch screen instrument 11, as described herein, for reasons of some likely benefit. The user's interaction with instrument 11 may involve other parts of the system 10 such as processor 31, operator console 32, database 33, and outside connections module 34. Processor 31 and touch screen instrument 11 may be controlled and overseen by an operator at console 32. Processor 31 may be connected to database 33. Database 33 may provide storage of various kinds of information for analysis and identification purposes. The processor may provide for and tie in with outside connections module 34 to networks, software sources, databases of such entities as the FBI, Homeland Security, investigative agencies, intelligence agencies, watch lists, cable systems, the web, optical fiber systems, wireless communications such as satellites, cell phone systems (e.g., GSM), and other pertinent resources.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A biometric data collection system comprising: a touch screen; a plurality of keys situated on the touch screen, one or more of the plurality of keys configured to allow a user to enter information into the system; and at least one sensor located behind at least one key of the plurality of keys; wherein the at least one sensor located behind the at least one key is for obtaining a finger print of a user touching the at least one key; wherein the obtaining of the fingerprint is not detectable by the user.

2. The system of claim 1, further comprising at least one camera situated behind the touch screen for obtaining an image of the user.

3. The system of claim 1, further comprising at least one sound sensor for obtaining voice sounds of the user.

4. The system of claim 1, further comprising a copier for obtaining images of a user's documents possibly relating to an identity of the user.

5. The system of claim 1, further comprising at least one camera behind the touch screen for obtaining an image of an iris of the user.

6. The system of claim 2, wherein the at least one camera is for obtaining an image of the user's face.

7. A method for collecting biometric information comprising:
providing a touch screen configured to allow a user to enter information,
the touch screen having at least one key for the user; and
obtaining an image of a fingerprint of a finger of the user touching the at least one key;
wherein the obtaining of the fingerprint is not detectable by the user.

8. The method of claim 7, further comprising:
capturing images through the touch screen of the user; and
wherein the capturing images is not detectable by the user.

9. The method of claim 8, further comprising performing face recognition processing on the images.

10. The method of claim 8, further comprising performing iris recognition processing on the images.

11. The method of claim 8, further comprising performing skin and/or flesh recognition processing on the images.

12. A system for obtaining biometric data comprising: an instrument having a screen having at least one area sensitive to touch; and a sensor situated behind the at least one area sensitive to touch; wherein the sensor is configured to collect biometric data while a user enters information into the instrument via the at least one area sensitive to touch; and obtaining an image of a fingerprint of a finger of the user touching the at least one area sensitive to touch; wherein the obtaining of the fingerprint is not detectable by the user.

13. The system of claim 12, wherein the sensor is for obtaining an image of an entity that touches the at least one area.

14. The system of claim 13, further comprising a camera for obtaining an image of a user that has the entity that touches the at least one area.

15. The system of claim 14, wherein the camera is for obtaining an image of a face of the user and/or an image of an iris of the user.

16. The system of claim 15, further comprising:
a microphone for obtaining sound prints of the user.

17. The system of claim 13, further comprising:
a processor connected to the instrument;
a database connected to the processor;
an operator console connected to the processor; and
an outside connections module connected to the processor.

18. The system of claim 17, wherein the outside connections module provides the system access to networks, software sources, databases of such entities as investigative and intelligence agencies, watch lists, cable systems, the web, optical fiber systems, wireless communications, and/or other pertinent resources.

* * * * *